United States Patent [19]

Wise

[11] Patent Number: 5,678,834
[45] Date of Patent: Oct. 21, 1997

[54] TANDEM POSITIONING ASSIST TOOL

[75] Inventor: Glenn Wise, Dallas, Tex.

[73] Assignee: GSW Enterprises, Carrollton, Tex.

[21] Appl. No.: 611,828

[22] Filed: Mar. 6, 1996

[51] Int. Cl.⁶ .................................................. B62D 33/08
[52] U.S. Cl. ............................. 280/149.2; 180/209
[58] Field of Search .................. 280/149.2; 180/209

[56] References Cited

U.S. PATENT DOCUMENTS

| | | | |
|---|---|---|---|
| 4,033,625 | 7/1977 | Fikse | 298/22 R |
| 5,314,201 | 5/1994 | Wessels | 280/407.1 |
| 5,326,144 | 7/1994 | Forcier | 294/19.1 |
| 5,346,233 | 9/1994 | Moser | 280/149.2 |
| 5,449,190 | 9/1995 | Ford | 280/149.2 |
| 5,460,237 | 10/1995 | Schueman | 280/149.2 |
| 5,505,475 | 4/1996 | Turner | 280/149.2 |

*Primary Examiner*—Kenneth R. Rice
*Attorney, Agent, or Firm*—Betty Formby; Robert Groover; Matthew Anderson

[57] ABSTRACT

A tool to aid in adjusting the position of a tandem rig under a trailer. The tool attaches to the tandem, where it can be adjusted to apply a force to the handle which unlocks the positioning pins. This allows adjustments to the position to be made without the need to walk back and check the tandem to see if the positioning pins have been freed from their locked position.

20 Claims, 4 Drawing Sheets

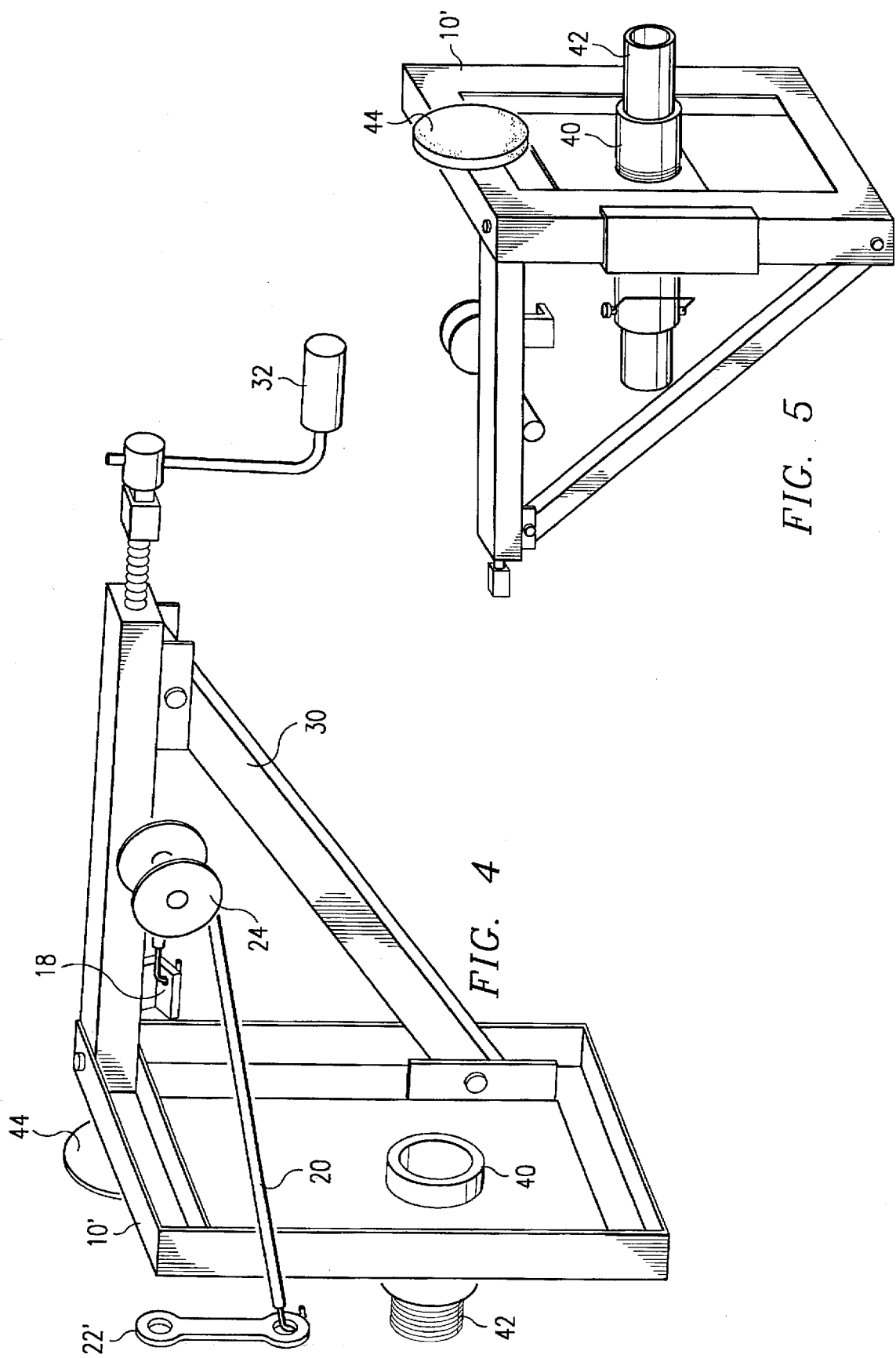

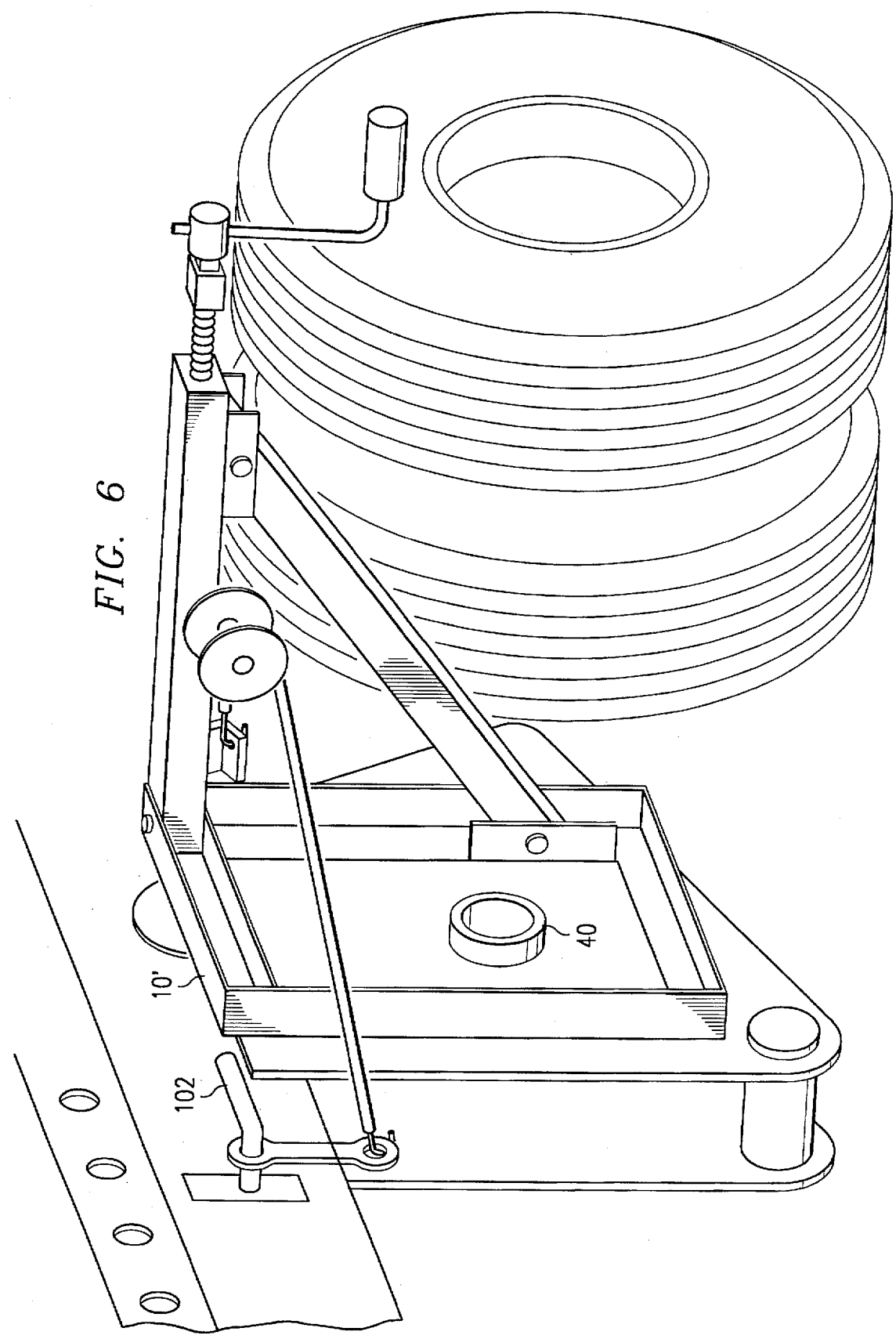

TANDEM POSITIONING ASSIST TOOL

BACKGROUND AND SUMMARY OF THE INVENTION

This invention relates to tractor/trailer rigs, and to positioning the tandem under the trailer.

In most tractor-trailer rigs, which have increasingly long trailers, the trailers will have a tandem, so called because this unit usually contains two axles. It also contains the suspension system and brakes for the trailer. These tandems can be moved along the length of the trailer to provide stability when loading and/or to distribute the weight of the load during transport.

During loading/unloading of the trailer, shippers prefer having the wheels in the back-most position to provide stability and safety. This is especially true when loading heavy cargo, which may otherwise cause the trailer to "see-saw" over the tandem assembly when heavy loads are added. In contrast, when the trailer is on the road, it is necessary to have the wheels moved more toward the front of the trailer, in order to distribute the load evenly across the axles. The exact position desired will depend on the weight and distribution of the load being carried.

The tandem moves along rails on the underside of the trailer. Large 3" locking pins on the tandem fit into 3½" holes in the rails to prevent sliding of the tandem when the trailer is in motion. Depending on the type of trailer, there will typically be two or four pins to hold the suspension in place, with the pins being in pairs on each side of the trailer. Fruehauf trailers currently have only 2 pins, and moving the tandem changes the weight distribution by about 500 pounds per hole, assuming the trailer is fully loaded; Dorsey trailers now have 4 pins, with a corresponding 250 pound weight shift per increment. The pins are spring loaded, to be sure that they stay in place, with a positioning handle mounted on the underside of the trailer which may be manipulated to unlock or lock the pins. When the positioning handle is pulled, enough force must be applied to overcome the spring loading, and to hold the pins in an unlocked position, the handle must be held in the open position.

When the driver wants to change the positioning of the wheels, three steps are necessary.

First, with the trailer held in position by chocks or brakes, the positioning handle must be manipulated to pull the pins out of their corresponding holes and hold them in the unlocked position.

Second, the tandem is held in place while the driver gets into the cab and moves the trailer to the required position over the tandem.

Thirdly, the pins must be reseated. This requires that the handle be released so that the pins may move back into the locked position, following which the driver again gets into the cab and slowly moves the trailer until the pins slide into their corresponding holes and once again lock the trailer and tandem together. Finally, the driver will normally walk back to check that all pins are securely in place.

When the trailer is new and the driver is experienced, the process of moving the position of the tandem may proceed very quickly. The pins slide easily out of their holes, the driver will have correctly estimated the distance he will need to move the rig to properly position the wheels under the trailer and a minimum number of trips between the cab of the tractor and the positioning handle are necessary. Unfortunately, with the wear and tear on the trailers, it is usually not this simple. The pins will, in a short time, develop grooves where they rub against the sides of the holes. Once these grooves have been formed, the previously easy step of unlocking the pins becomes a great deal more difficult. Generally there will be one position of the pin inside the hole where it will slide out, and the rig must be moved slightly or rocked back and forth to center the pins in the holes. This position must be found by the driver by trial and error, with each attempt necessitating a trip from near the back of the trailer to the cab of the tractor rig. Complicating the process further is the fact that pins on opposite sides of the trailer may have worn differently, due to uneven loading. Finding the right position for two separate, badly worn, pins can be a frustrating job. Finally, the use of longer and longer trailers (with consequently longer walks between the tandem and the cab), combined with the fact that the driver may be doing this in extreme weather conditions, adds to the potential for this being a very frustrating and time-consuming task.

Automated systems are available which allow the driver to make all the necessary adjustments to the tandem from the cab of the tractor, without the steps described above. The automated systems are, however, very expensive and are common only where the driver is an owner/operator. In large fleets, where the drivers are not themselves owners, the capital expenditure necessary for such a system is generally considered to be too expensive to be practical.

Given these problems, a tool to help the drivers in this job is very desirable. An ideal tool for this job will have several important characteristics. It will be portable and easy to store, relatively inexpensive, and easy to use. The capability will exist to use the tool on different types of trailers with a minimum amount of trouble, and to use it on older trailers, where the positioning handle may be bent out of shape due to improper handling.

One prior art attempt to solve this problem is shown in U.S. Pat. No. 5,326,144. This invention was designed to work on a Dorsey type trailer and would not work on other types of trailers, such as a Fruehauf (see below for the differences). This prior art attempt also has the drawback that one end of the tool attaches to the trailer itself, which will be moving in relation to the tandem frame to which the other end of the tool is attached. This means that if a large adjustment is to be made, the driver may use this tool to help release the pins, but he must then walk back to the tandem, disconnect the tool, and fasten the handle in the unlocked position before he can make the adjustment to the position of the trailer over the tandem. Once the position is adjusted, he will make another trip back to the tandem to release the positioning handle.

The invention herein described solves the above problems, and provides a method and tool to speed up adjustment of the tandem, eliminating the need for many trips back and forth between the cab and tandem.

The innovative tool is a portable unit which is attached to the tandem, not the trailer. This means that large adjustments may be made to the position of the tandem with the tool in place. The tool has a tensioning arm, which, when tensioned by the driver, provides a steady pull on the positioning handle, so that when the pins are centered in their holes, the pins will automatically unlock and remain in the unlocked position. Optionally, a small reflector, or other indicator, is located on an arm such that when the positioning handle is moved and the pins are unlocked, the reflector is visible to the driver in the cab, eliminating the need for him to walk back to the rig to check. The tensioning arm is held in place on the tandem by a baseplate that attaches easily. Thus the driver can quickly attach this tool, walk to the cab, maneuver the rig until the pins unlock, then, without getting out of the cab, move the tractor/trailer rig over the tandem to the proper position. The driver will then simply walk back to release the positioning handle, remove the tool, and proceed as before to reseat the pins.

Because of variations in the trailers the tool will be used on, two different baseplates have currently been designed, to fit Fruehauf and Dorsey trailers, and further versions are envisioned.

BRIEF DESCRIPTION OF THE DRAWING

The disclosed inventions will be described with reference to the accompanying drawings, which show important sample embodiments of the invention and which are incorporated in the specification hereof by reference, wherein:

FIG. 4 shows a view of one embodiment of the innovative tool, as it would be used on a Dorsey trailer.

FIG. 5 shows a detail of the backside of the baseplate of the tool for a Dorsey trailer.

FIG. 6 shows the tool in place on a Dorsey trailer.

DETAILED DESCRIPTION OF THE PREFERRED EMBODIMENTS

The numerous innovative teachings of the present application will be described with particular reference to the presently preferred embodiment (by way of example, and not of limitation), in which:

In the presently preferred embodiment, the innovative tool consists of a base plate which attaches to the tandem, a tensioning arm to provide tension on the positioning handle to cause it to move to the unlocked position, a bracing arm to provide stability to the assembly, and an optional signal device to provide an indicator which can be seen from the cab of the rig, showing that the pins have or have not released. These parts are attached to each other by removable means, such as cotter pins, so that the baseplate may be interchanged to accommodate different trailers. This also means that it is possible to dismantle the tool for storage, where necessary. The tool will be discussed with reference to FIGS. 1 through 6.

The positioning mechanism on the trailers is generally designed in one of two ways, depending on the manufacturer.

In Dorsey, Monon, and most other trailers, the handle which releases the pins is designed to pull straight out from the trailer in a direction perpendicular to the long side of the trailer and roughly parallel to the ground. Typically, when the handle is pulled out, a triangular piece attached to the long axis of the handle may be slid into position within a U-shaped mechanism. In this position, the handle will hold the pins in their unlocked position while the tandem is moved.

In Fruehauf trailers, by contrast, the handle is designed to rotate about an axis under the trailer, so that the handle is actually pulled up to release the pins, much in the manner of a pump handle. The handle may then be held in this position by seating it on a small shelf provided for the purpose, so that the pins remain unlocked while adjustments are made.

Because the direction of movement of the positioning handle changes from one type of trailer to another, the positioning arm must be used in a different manner with the different types of trailers. Likewise, the baseplate portion of the tool must be specific for the type of trailer on which it is being used, so that it may be securely attached during operation of the tool. The tool and its operation will be described below, first in relation to Fruehauf trailers (and those whose operation is similar) and then in relation to Dorsey (and similar) trailers.

Figure 2:
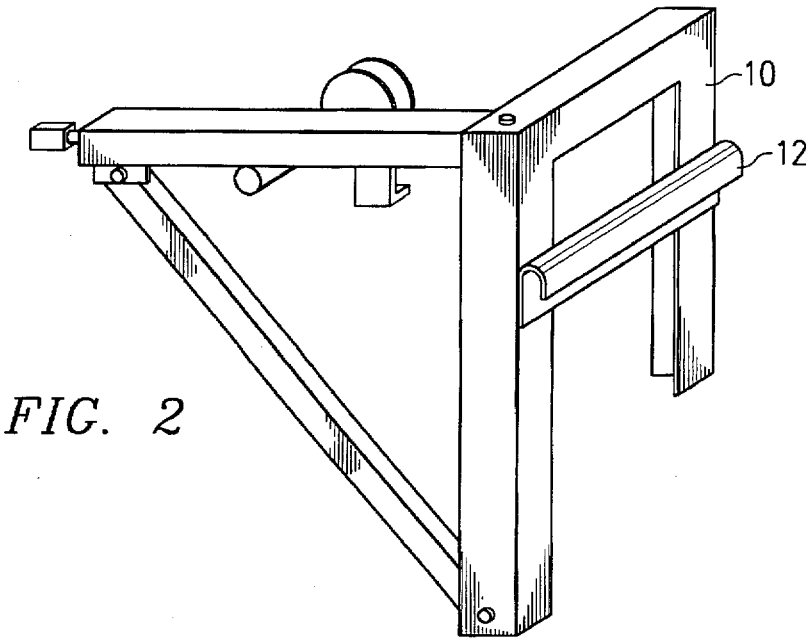
FIG. 2 shows a detail of the backside of the baseplate of the tool for a Fruehauf trailer.
Figure 3:
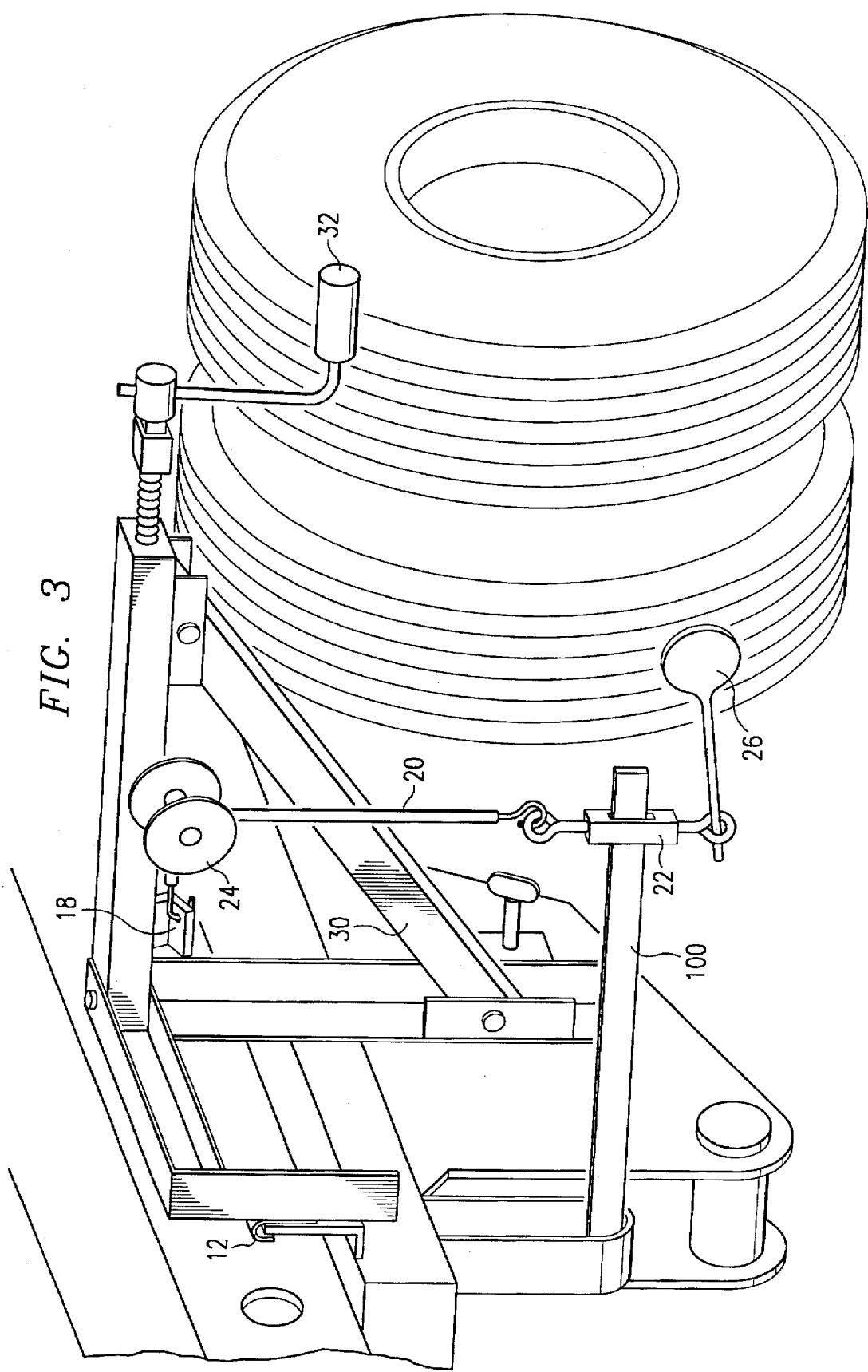
FIG. 3 shows the tool in place on a Fruehauf trailer.

For Fruehauf trailers, the presently preferred embodiment uses a baseplate (10) as shown in FIG. 2, where a lip (12) on one side of the baseplate hooks over a plate which is part of the tandem. The plate, and its relative position on the tandem, have been an enduring feature of Fruehauf trailers for many years, so that the baseplate should be useable with trailers manufactured in many different years. Once the tool is hung on the tandem, the lip resists movement of the baseplate when tension is applied to the positioning handle to move it upward, providing a stable mounting of the tool.

Figure 1:
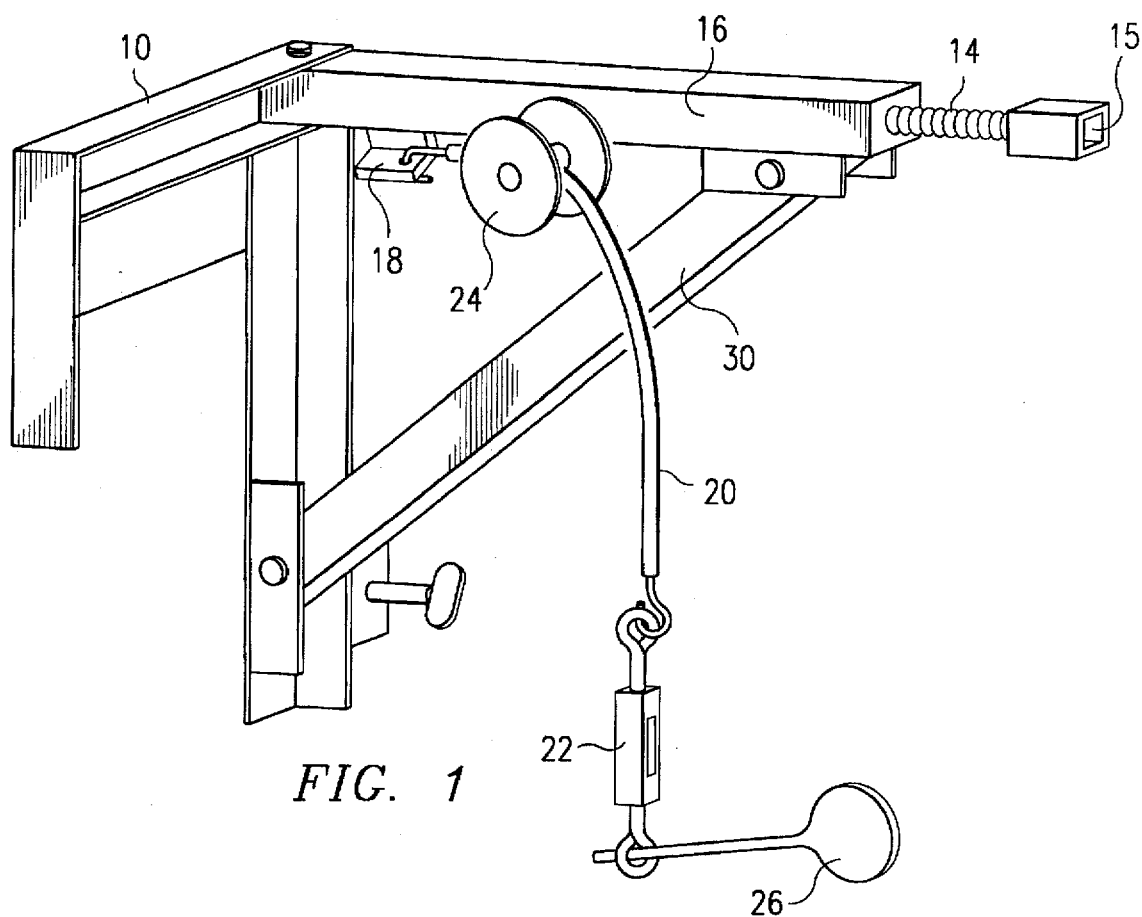
FIG. 1 shows a view of one embodiment of the innovative tool, as it would be used on a Fruehauf trailer.

The tandem positioning assist tool (TPAT) of the presently preferred Fruehauf embodiment is shown in FIG. 1. Here a heavy duty threaded post (14) is movably fixed in a length of channel iron (16). As the threaded post is turned, a traveller (18) moves along its length. The tensioning arm, as used with Fruehauf trailers, is completed by three heavy duty bungee cords (20)(only one is shown). These cords are attached at one end to the traveller, with the other end attached to the positioning handle (100) by means of a handle sling (22). As shown in this figure, the bungee cords are routed over an extension (24) on the tensioning arm to change the direction of the pull. A handle sling (22) slips over the Fruehauf handle. One end of the sling is used to attach the bungees, while the other end may be used to attach the optional signal device (26), as shown in this drawing. A bracing arm (30), attached to the baseplate and tensioning arm, provides stabilization of the post when under stress.

Once the tool is in place (see FIG. 3), the threaded post will be turned, positioning the traveller to provide appropriate tension to the handle. The post, which contains a socket end (15), will preferably be turned by a battery-powered lug wrench, which many truckers carry, but can also be turned by manual means, such as a wrench, or a handle (32) which will fit into the socket. After proper tension is applied, the driver will go to the cab of the tractor, and with the trailer brakes on, rock the trailer back and forth until the pins are unlocked. Once this is accomplished, he can stay in the cab, leave the trailer brakes (which are part of the tandem assembly) locked, and move the trailer over the tandem to the desired position. Only then does he have to go back to the tandem to release tension on the tool and remove the tool. A further rocking motion of the trailer will seat the pins and he is done with this job.

For Dorsey, and related types of trailers, the presently preferred embodiment uses a baseplate (10') as shown in FIG. 5. Since the positioning handle for the Dorsey moves in a direction perpendicular to the baseplate, the application of tension through the tensioning arm to the positioning handle automatically stabilizes the tool, and the main need is to provide a way to align the tool with respect to the positioning handle. The presently preferred embodiment makes use of a deep tube which is part of the Dorsey tandem frame, and extends inward from the tandem frame in all Dorsey models. The presently preferred Dorsey embodiment utilizes a 1¼" pipe (40) which is affixed to the baseplate, and which will project into the tube in a male-to-female mating. Because a large spring rests on top of the tube, causing deformation of the tube over time, the pipe will typically extend only about one-half to three-quarters of an inch into the tube. To compensate for this, a 1⅛" pipe (42) runs inside the 1¼" pipe, and may be extended for 6 to 10 inches into the tube, providing further support. To allow for some differences in the location of the tube on the Dorsey tandem, the position of the pipe may be adjusted upward or downward in relation to the baseplate. In addition a magnet (44) is utilized at the opposite end of the baseplate to provide some extra attachment.

For Dorsey trailers, the main body of the positioning arm is the same, but the bungees are routed as shown in FIG. 6, to pull in a direction parallel to the tensioning arm. Once the tool is in position (see FIG. 4), the use of it is the same as in the Fruehauf trailer. The threaded post (14) is turned, moving the traveller (18) and applying tension through the bungee cords (20) to the handle (102). The driver rocks the trailer (with brakes set) to unlock the pins, adjusts the position of the tandem under the trailer, removes the tool, and reseats the pins.

The baseplate and the tensioning arm of this inventive tool are removable attached together, so that they may be detached from each other. In this way, a driver who changes from one type of trailer and another can simply switch the positioning arm from one base to the other. This makes the tool more versatile, and since only one tensioning arm assembly is needed for the various types of trailers, the cost of the tool is reduced.

The invention has been described in terms of baseplates which fit on Dorsey or Fruehauf trailers, but the invention also applies to baseplates that will fit other trailers as well. In order to allow large shifts in the position of the tandem, it is necessary that the tool be designed to attach to some portion of the tandem assembly itself, and not to any portion of the trailer.

Additionally, because the parts of the tools may be broken apart easily, some portions of the tool can do double duty:

When not being used for its primary purpose, the tensioning arm, minus the bungee cords, can also be used in moving the fifth wheel on the tractor. When the trailer is being parked in a large warehouse situation, yard dogs (small, highly maneuverable vehicles which can haul the trailers for short distances) will often pack the loaded trailers closely together while waiting for a tractor/driver to become available for that load. When the driver does bring his tractor to connect with the trailer, he can find himself trying to pull the handle on the fifth wheel, to attach the trailer and tractor, with very little room to maneuver.

The handle of the fifth wheel is very similar to a Dorsey handle in that it pulls straight out, in a direction perpendicular to the length of the trailer. When the above situation arises, and space to pull the handle on the fifth wheel is limited, the baseplate and support arm may be removed from the tool, and the threaded rod assembly may be manually positioned next to the handle, with the traveller positioned behind the handle of the fifth wheel. Then, by rotating the threaded post, the traveller moves outward, pulling the handle.

Additionally, the magnet used in the Dorsey version can also be attached to the positioning arm and used to hold small tools.

The parts of the innovative tool have been made from readily available materials, or modified from standard tools, in order to keep the cost of the tool low. The specifics of the presently preferred embodiment are as follows:

Both the body of the tensioning arm and the support arm are made of channel iron; the threaded rod has a ⅝ inch diameter, 8 threads per inch, and a ½ drive fitting. One version of the handle sling has been modified from a turn-buckle and eye-bolts, while a second version is made from a metal plate, with attached channels, through which the Fruehauf handle may be inserted.

The baseplate for the Fruehauf model is composed of pieces of 90° angle iron, welded into a roughly U-shaped form, with one arm of the "U" being longer. The tensioning arm and bracing arm are attached to the ends of the longer leg of the U, while the rest of the baseplate provides lateral stability. On the backside of the Fruehauf baseplate, a smaller U is attached, opening downward, to provide the lip to hold the baseplate in position.

According to a disclosed class of innovative embodiments, there is provided: A tool for positioning the tandem on a trailer, said tool comprising a rigid framework which may be attached to the tandem, wherein said tool allows the user to unlock the adjustment pins on the tandem.

According to another disclosed class of innovative embodiments, there is provided: A tool for positioning the tandem on a trailer, said tool comprising: a tensioning arm to apply tension to the positioning handle which unlocks the adjustment pins; and a baseplate, attached on a first side to said tensioning arm; wherein a second side of said baseplate, which is opposite to said first side, can be attached to the tandem to position said tensioning arm relative to the positioning handle of the tandem.

According to another disclosed class of innovative embodiments, there is provided: A method of adjusting the location of the tandem under a trailer, the location being adjusted by moving adjustment pins to appropriately located holes, said method comprising: providing a tool comprising a baseplate and a tensioning arm attached to a first side of said baseplate; attaching a second side of said baseplate to the tandem; attaching said tensioning arm to a positioning handle which controls movement of said adjustment pins; applying tension to said positioning handle by means of said tensioning arm; rocking the trailer back and forth until said tool causes said positioning handle to move said adjustment pins to an unlocked position; moving the trailer to a desired position over the tandem rig; releasing tension on said tensioning arm so that said pins may return to a locked position.

MODIFICATIONS AND VARIATIONS

As will be recognized by those skilled in the art, the innovative concepts described in the present application can be modified and varied over a tremendous range of applications, and accordingly the scope of patented subject matter is not limited by any of the specific exemplary teachings given.

For example, as will be obvious to those of ordinary skill in the art, the optional signal device may be a reflector, flag, or other visual indicator. It could even be a flashlight, or other light source, for use at night.

The signal device is preferably positioned so that it is visible from the cab of the tractor at all times, allowing the driver to monitor the movement of the handle while still in the cab, but alternatively, it could be positioned to be visible only after the handle had been moved to its tensioned position, indicating that the pins had been released.

The tool can also be manufactured so that when not in use, the tool can fold for storage.

The specific materials shown in making the presently preferred embodiment are not necessary, as long as the idea of the invention is preserved. For instance, a version utilizing composite material, rather than metal, would provide the strength needed, without the weight.

What is claimed is:

1. A tool for positioning the tandem on a trailer, said tool comprising a rigid framework which may be attached to the tandem, wherein said tool allows the user to unlock the adjustment pins on the tandem.

2. The tool of claim 1, further comprising a signal device to show movement of the handle at a distance.

3. The tool of claim 1, wherein said rigid framework comprises: a tensioning arm which may be connected to the positioning handle which unlocks the adjustment pins; and a baseplate, attached on a first side to said tensioning arm.

4. The tool of claim 3, wherein said tensioning arm comprises:

a threaded post;

a traveller, movably attached to said threaded post such that said traveller moves along the length of said threaded post when said threaded post is rotated;

a tension device, attached at a first end to said traveller and at a second end to said positioning handle.

5. The tool of claim 4, wherein said tension device comprises heavy duty bungee cords.

6. The tool of claim 4, wherein said second end of said tension device is attached to said positioning handle via a handle sling.

7. The tool of claim 3, wherein said baseplate comprises a lip on said second side of said baseplate, wherein said baseplate can be attached to the tandem by said lip.

8. The tool of claim 3, wherein said baseplate comprises a pipe attached to a second side of said baseplate, opposite to said first side, wherein said baseplate can be attached to the tandem by insertion of said pipe into an opening in the tandem.

9. A tool for positioning the tandem on a trailer, said tool comprising:

a tensioning arm to apply tension to the positioning handle which unlocks the adjustment pins; and a baseplate, attached on a first side to said tensioning arm;

wherein a second side of said baseplate, which is opposite to said first side, can be attached to the tandem to position said tensioning arm relative to the positioning handle of the tandem.

10. The tool of claim 9, further comprising a signal device to show movement of the handle at a distance.

11. The tool of claim 9, wherein said tensioning arm comprises:

a threaded post;

a traveller, movably attached to said threaded post such that said traveller moves along the length of said threaded post when said threaded post is rotated;

a tension device, attached at a first end to said traveller and at a second end to said positioning handle.

12. The tool of claim 11, wherein said tension device comprises heavy duty bungee cords.

13. The tool of claim 11, wherein said second end of said tension device is attached to said positioning handle via a handle sling.

14. The tool of claim 9, wherein said baseplate comprises a lip on said second side of said baseplate, wherein said baseplate can be attached to the tandem by said lip.

15. The tool of claim 9, wherein said baseplate comprises a pipe attached to a second side of said baseplate, opposite to said first side, wherein said baseplate can be attached to the tandem by insertion of said pipe into an opening in the tandem.

16. A method of adjusting the location of the tandem under a trailer, the location being adjusted by moving adjustment pins to appropriately located holes, said method comprising:

providing a tool comprising a baseplate and a tensioning arm attached to a first side of said baseplate;

attaching a second side of said baseplate to the tandem;

attaching said tensioning arm to a positioning handle which controls movement of said adjustment pins;

applying tension to said positioning handle by means of said tensioning arm;

rocking the trailer back and forth until said tool causes said positioning handle to move said adjustment pins to an unlocked position;

moving the trailer to a desired position over the tandem rig; releasing tension on said tensioning arm so that said pins may return to a locked position.

17. The method of claim 16, further comprising attaching a signal device to said tensioning arm to make movement of said handle visible from a distance.

18. The method of claim 16, wherein said tensioning arm comprises:

a threaded post enclosed in a channel;

a traveller, movably fixed on said threaded post such that said traveller is moved along said threaded post when said threaded post is rotated; and at least one expansion band, attached at a first end to said traveller and capable of being attached at a second end to the positioning handle; and said step of applying tension to said handle comprises fastening said at least one expansion band to said handle and rotating said threaded post to move said traveller in a direction that applies tension to said at least one expansion band.

19. The method of claim 16, wherein said step of attaching said baseplate to said tandem comprises hanging said baseplate on said tandem by a lip which is permanently attached to said second side of said baseplate.

20. The method of claim 16, wherein said step of attaching said baseplate to said tandem comprises inserting a pipe, which is attached to said second side of said baseplate, into an opening on the tandem.

* * * * *